United States Patent
Conners (10) Patent No.: US 9,027,583 B2
(45) Date of Patent: May 12, 2015

(54) LOW SHOCK STRENGTH INLET

(71) Applicant: Gulfstream Aerospace Corporation, Savannah, GA (US)

(72) Inventor: Timothy R. Conners, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 86 days.

(21) Appl. No.: 13/705,211

(22) Filed: Dec. 5, 2012

(65) Prior Publication Data

US 2013/0118594 A1  May 16, 2013

Related U.S. Application Data (62) Division of application No. 12/000,066, filed on Dec. 7, 2007, now Pat. No. 8,393,158.

(60) Provisional application No. 60/960,986, filed on Oct. 24, 2007.

(51) Int. Cl.
*F02B 27/00* (2006.01)
*F02C 7/042* (2006.01)
(Continued)

(52) U.S. Cl.
CPC ............ *F02C 7/042* (2013.01); *B64D 33/02* (2013.01); *B64D 2033/026* (2013.01); *F02C 7/045* (2013.01); *Y02T 50/672* (2013.01)

(58) Field of Classification Search
CPC .. B64D 2033/026; B64D 33/02; F02C 7/042; F02C 7/045; Y02T 50/672
USPC ............ 60/226.1, 767, 768; 137/15.1, 15.2; 244/53 B
See application file for complete search history.

(56) References Cited

U.S. PATENT DOCUMENTS

| | | | |
|---|---|---|---|
| 1,785,477 | A | 12/1930 | Cooney |
| 1,805,994 | A | 5/1931 | Niemeyer |
| 2,579,049 | A | 12/1951 | Price |

(Continued)

FOREIGN PATENT DOCUMENTS

| | | |
|---|---|---|
| BG | 885908 A | 1/1962 |
| CA | 2634012 A1 | 4/2008 |

(Continued)

OTHER PUBLICATIONS

USPTO, Final Office Action in U.S. Appl. No. 12/605,071, mailed Nov. 15, 2013.

(Continued)

*Primary Examiner* — Gerald L Sung
(74) *Attorney, Agent, or Firm* — Ingrassia, Fisher & Lorenz, P.C.

(57) ABSTRACT

A supersonic inlet having a cowl lip configured to capture the conic shock and exhibit a zero or substantially zero cowl angle is disclosed herein. The inlet may be configured to employ a relaxed isentropic compression surface and an internal bypass. The nacelle bypass may prevent flow distortions, introduced by the capture of the conic shock, from reaching the turbomachinery, thereby allowing the cowl angle to be reduced to zero or substantially zero. Such a cowl angle may reduce the inlet's contribution to the overall sonic boom signature for a supersonic aircraft while allowing for an increase in engine pressure recovery and a subsequent improvement in generated thrust by the engine.

4 Claims, 5 Drawing Sheets

(51) Int. Cl.
*B64D 33/02* (2006.01)
*F02C 7/045* (2006.01)

(56) References Cited

U.S. PATENT DOCUMENTS

| | | |
|---|---|---|
| 2,959,916 A | 10/1957 | Carlton et al. |
| 2,840,322 A | 6/1958 | Griffith |
| 2,874,922 A | 2/1959 | Whitcomb |
| 2,916,230 A | 12/1959 | Nial |
| 2,920,446 A | 1/1960 | Ranard |
| 2,934,893 A | 5/1960 | Streeter |
| 2,960,293 A | 11/1960 | Besson |
| 2,966,028 A | 12/1960 | Johnson et al. |
| 2,970,431 A | 2/1961 | Harshman |
| 2,971,330 A | 2/1961 | Clark |
| D191,019 S | 8/1961 | Thieblot |
| 2,995,320 A | 8/1961 | Gottschalk |
| D191,930 S | 12/1961 | Cella |
| 3,032,977 A | 5/1962 | Neitzel |
| 3,066,483 A | 12/1962 | Stratford |
| 3,067,578 A | 12/1962 | Goodall et al. |
| 3,188,025 A | 6/1965 | Morrehead |
| D202,311 S | 9/1965 | Rellis |
| 3,242,671 A | 3/1966 | Moorehead |
| D206,299 S | 11/1966 | Rellis |
| 3,302,657 A | 2/1967 | Bullock |
| 3,314,437 A * | 4/1967 | Pike .......................... 137/15.1 |
| 3,412,962 A | 11/1968 | Killlian |
| 3,417,767 A | 12/1968 | Young |
| 3,425,650 A | 2/1969 | Silva |
| 3,430,640 A | 3/1969 | Lennard |
| 3,447,325 A | 6/1969 | Tiley |
| 3,447,761 A | 6/1969 | Whitener et al. |
| 3,450,141 A | 6/1969 | Braendlein |
| D215,894 S | 11/1969 | Rellis |
| 3,477,455 A | 11/1969 | Campbell |
| 3,478,989 A | 11/1969 | Bielefeldt |
| 3,489,375 A | 1/1970 | Rethorst |
| 3,490,556 A | 1/1970 | Bennett, Jr. et al. |
| 3,497,163 A | 2/1970 | Wakefiled |
| 3,587,973 A | 6/1971 | Wolf et al. |
| 3,643,901 A | 2/1972 | Patapis |
| 3,647,160 A | 3/1972 | Alperin |
| 3,655,147 A | 4/1972 | Preuss |
| 3,709,446 A | 1/1973 | Espy |
| 3,737,119 A | 6/1973 | Cheng |
| 3,776,489 A | 12/1973 | Wen |
| 3,794,274 A | 2/1974 | Eknes |
| 3,854,286 A | 12/1974 | Klees |
| 3,971,535 A | 7/1976 | Jones |
| 4,037,808 A | 7/1977 | Kaniut |
| 4,055,041 A | 10/1977 | Adamson et al. |
| 4,114,836 A | 9/1978 | Graham et al. |
| 4,142,365 A | 3/1979 | Sargisson et al. |
| 4,172,574 A | 10/1979 | Spillman |
| 4,176,813 A | 12/1979 | Headley et al. |
| 4,189,939 A | 2/1980 | West et al. |
| 4,240,597 A | 12/1980 | Ellis et al. |
| 4,272,043 A | 6/1981 | Spillman |
| 4,307,743 A | 12/1981 | Dunn |
| 4,311,289 A | 1/1982 | Finch |
| 4,318,328 A | 3/1982 | Rona |
| 4,327,581 A | 5/1982 | Jackson et al. |
| 4,378,922 A | 4/1983 | Pierce |
| 4,390,150 A | 6/1983 | Whitener |
| 4,483,497 A | 11/1984 | Rethorst |
| 4,598,886 A | 7/1986 | Friebel et al. |
| 4,641,796 A | 2/1987 | Feifel |
| 4,644,746 A | 2/1987 | Hartman |
| 4,650,139 A | 3/1987 | Taylor |
| 4,691,879 A | 9/1987 | Greene |
| 4,691,881 A | 9/1987 | Gioia |
| 4,706,902 A | 11/1987 | Destuynder et al. |
| 4,718,620 A | 1/1988 | Braden et al. |
| 4,723,214 A | 2/1988 | Frei |
| 4,750,693 A | 6/1988 | Lobert et al. |
| 4,815,680 A | 3/1989 | Goldhammer |
| 4,907,765 A | 3/1990 | Hirschel et al. |
| 4,949,269 A | 8/1990 | Buisson et al. |
| 4,989,406 A | 2/1991 | Vdoviak et al. |
| 5,072,894 A | 12/1991 | Cichy |
| 5,114,099 A | 5/1992 | Gao |
| 5,115,999 A | 5/1992 | Buchsel et al. |
| 5,133,519 A | 7/1992 | Falco |
| 5,143,320 A | 9/1992 | Boyadjian |
| 5,216,878 A | 6/1993 | Klees |
| 5,251,846 A | 10/1993 | Rethorst |
| 5,275,360 A | 1/1994 | Porter et al. |
| 5,311,735 A | 5/1994 | Orlando |
| 5,322,242 A | 6/1994 | Tracy |
| D349,271 S | 8/1994 | Inoue |
| 5,341,677 A | 8/1994 | Maris |
| 5,358,156 A | 10/1994 | Rethorst |
| 5,526,999 A | 6/1996 | Meston |
| 5,676,333 A | 10/1997 | Rethorst |
| 5,694,768 A | 12/1997 | Johnson et al. |
| 5,731,995 A | 3/1998 | Benne et al. |
| 5,738,156 A | 4/1998 | Stewart |
| 5,740,984 A | 4/1998 | Morgenstern |
| 5,794,887 A | 8/1998 | Komerath et al. |
| 5,796,612 A | 8/1998 | Palmer |
| 5,797,563 A | 8/1998 | Blackburn et al. |
| 5,842,666 A | 12/1998 | Gerhardt et al. |
| 5,875,998 A | 3/1999 | Gleine et al. |
| 5,897,076 A | 4/1999 | Tracy |
| 5,927,130 A | 7/1999 | Watson et al. |
| 5,934,607 A | 8/1999 | Rising et al. |
| 5,947,422 A | 9/1999 | Wille |
| 5,971,000 A * | 10/1999 | Koncsek et al. .......... 137/14 |
| D417,184 S | 11/1999 | Hartmann et al. |
| 5,992,797 A | 11/1999 | Seidel et al. |
| D428,381 S | 7/2000 | Hartmann et al. |
| 6,098,923 A | 8/2000 | Peters |
| 6,102,328 A | 8/2000 | Kumata et al. |
| D431,522 S | 10/2000 | Fujino |
| 6,149,101 A | 11/2000 | Tracy |
| 6,161,802 A | 12/2000 | Cunningham, Jr. |
| 6,216,063 B1 | 4/2001 | Lind et al. |
| 6,253,126 B1 | 6/2001 | Palmer |
| 6,283,407 B1 | 9/2001 | Hakenesch |
| 6,308,913 B1 | 10/2001 | Fujino et al. |
| 6,336,060 B1 | 1/2002 | Shigemi et al. |
| 6,341,247 B1 | 1/2002 | Hreha et al. |
| 6,424,923 B1 | 7/2002 | Huyer et al. |
| 6,487,848 B2 | 12/2002 | Zysman et al. |
| 6,698,684 B1 | 3/2004 | Henne et al. |
| 6,793,175 B1 | 9/2004 | Sanders et al. |
| 6,854,687 B1 | 2/2005 | Morgenstern et al. |
| 6,905,091 B2 | 6/2005 | Berson et al. |
| 6,971,000 B1 | 11/2005 | Sinharoy et al. |
| 7,048,229 B2 | 5/2006 | Sanders et al. |
| 7,168,236 B2 | 1/2007 | Schmotolocha et al. |
| 7,207,520 B2 | 4/2007 | Lundy et al. |
| 7,252,263 B1 | 8/2007 | Hagemeister et al. |
| 7,322,179 B2 | 1/2008 | Kobayashi et al. |
| 7,967,241 B2 | 6/2011 | Chase et al. |
| 2002/0088276 A1 | 7/2002 | Omotani et al. |
| 2002/0117581 A1 | 8/2002 | Sanders et al. |
| 2005/0081509 A1 | 4/2005 | Johnson |
| 2006/0213179 A1 | 9/2006 | Sanders et al. |
| 2008/0115454 A1 | 5/2008 | Xie |
| 2008/0271787 A1 | 11/2008 | Henne et al. |
| 2010/0012777 A1 | 1/2010 | Henne et al. |
| 2010/0043389 A1 | 2/2010 | Conners |

FOREIGN PATENT DOCUMENTS

| | | |
|---|---|---|
| CA | 2703602 A1 | 4/2009 |
| EP | 1527997 A2 | 5/2005 |
| GB | 879956 A | 10/1961 |
| GB | 2070139 A | 9/1981 |
| GB | 2149456 A | 6/1985 |
| JP | 09291850 | 11/1997 |

(56) References Cited

FOREIGN PATENT DOCUMENTS

| WO | 08045108 | 4/2008 |
|----|----------|--------|
| WO | 09055041 | 4/2009 |
| WO | 09085380 | 7/2009 |

OTHER PUBLICATIONS

USPTO, Final Office Action in U.S. Appl. No. 12/257,982, mailed Jan. 17, 2013.
USPTO, Notice of Allowance and Fee(s) Due in U.S. Appl. No. 12/000,066, mailed Sep. 12, 2012.
U.S. Office Action mailed Jun. 27, 2013 in U.S. Appl. No. 12/605,071.
European Extended Search Report dated Sep. 21, 2012; Application No. 08842021.1.
European Extended Search Report dated Sep. 21, 2012; Application No. 08867105.4.
USPTO "Non-Final Office Action" mailed Oct. 5, 2012; U.S. Appl. No. 12/257,982, filed Oct. 24, 2008.
U.S. Office Action issued Mar. 22, 2012 in U.S. Appl. No. 12/257,982.
"Sonic Boom Research;" Division of Applied Science; New York University; Jul. 1. 1974-Sep. 30. 1974. pp. 1-22.
"Conceptual Design, Integration, and Development Plan for an Efficient Low Sonic Boom Propulsion System Employing Advanced Supersonic Engine Cycles;" Integrated Inlet-Propulsion Systems Study Final Report; Conners et al.; Aug. 27, 2007; pp. 1-84.
"Wind Tunnel Testing of an Axisymmetric Isentropic Relaxed External Compression Inlet at Mach 1.97 Design Speed;" American Institute of Aeronautics and Astronautics, Inc.; Conners et al.; Jul. 8-11, 2007; pp. 1-12.
"Dynamic Analysis of Wind Tunnel Data from an Isentropic Relaxed Compression Inlet," American Institute of Aeronautics and Astronautics; Tacina et al.; Jul. 8-11, 2007; pp. 1-22.
"Supersonic Inlet Shaping for Dramatic Reductions in Drag and Sonic Boom Strength;" American Institute of Aeronautics and Astronautics, Inc.; Conners et al.; Jan. 9-12, 2006; pp. 1-24.
NASA SP 180, 1968, Edited by I. Schwartz, Second Conference on Sonic Boom Research.
AIAA 2006-30, 2006, Conners eta!., Supersonic Inlet Shaping for Dramatic Reductions in Drag and Sonic Boom Strength; pp. 1-24.
NASA Conference Publication 3027, 1988 C. Darden, et al., Status of Sonic Boom Methodology and Understanding.
AIAA Report 91-3103, 1991, G. Haglund and Boeing Commercial Airplane Group, HSCT Designs for Reduced Sonic Boom.
AIAA-98-2956, 1998, R. Seebass and B. Argrow, Sonic Boom Minimization Revisited.
1952, G. Whitham, The Flow Pattern of a Supersonic Projectile (from Communications on Pure and Applied Math, vol. V, 301-348).
1955, G. Whitham, On the Propagation of Weak Shock Waves.
AIAA 68-159, 1968, A. George, Reduction of Sonic Boom by Azimuthal Redistribution of Overpressure.
NASA Technical Note D-1494, 1962, H. Carlson, The Lower Bound of Attainable Sonic-Boom Overpressure and Design Methods of Approaching This Limit.
NASA Technical Report TR-213, 1964, H. Carlson, Correlation of Sonic-Boom Theory With Wind-Tunnel and Flight Measurements.
NASA Technical Note TN D-2877, F. Mclean, Some Nonasymptotic Effects on the Sonic Boom of Large Airplanes.
NASA Technical Note TN D-5148, 1969, R. Barger, Investigation of a Class of Bodies that Generate Far-Field Sonic-Boom Shock Strength and Impulse Independent of Body Length and Volume.
Gokhale, et al., "Numerical computations of supersonic inlet flow," International Journal for Numerical Methods in Fluids 2001; 36: 597-617.
Emami, et al., "Experimental Investigation of Inlet-Combustor Isolators for a Dual-Mode Scramjet at a Mach Number of 4," NASA Technical Paper 3502, May 1995.
NASA SP-255, 1971, Edited by I. Schwartz, Third Conference on Sonic Boom Research.
NASA Technical Note TN D-7218, 1973, H. Carlson, Application of Sonic-Boom Minimization Concepts in Supersonic Transport Design.
NASA Technical Note TN D-7842, 1975, C. Darden, Minimization of Sonic-Boom Parameters in Real and Isothermal Atmospheres.
NASA Technical Paper 1348, 1979, C. Darden, Sonic-Boom Minimization With Nose-Bluntness Relaxation.
NASA Technical Paper 1421, 1979, R. Mack, Wind-Tunnel Investigation of the Validity of Sonic-Boom-Minimization Concept.
NASA Technical Note TN D-7160, 1973, L. Hunton, Some Effects of Wing Planform on Sonic Boom.
NASA Technical Note TN D-6832, 1972, C. Thomas, Extrapolation of Sonic Boom Pressure Signatures by the Waveform Parameter Method.
Paper abstract, K. Plotkin, Wyle Laboratories, Sonic Boom Minimization: Myth or Reality.
NASA SP-147, 1967, A.R. Seebass, Sonic Boom Research.
Canadian Intellectual Property Office, Official Action for Canadian Patent Application No. 2,703,748, mailed Sep. 9, 2014.
Canadian Intellectual Property Office, Official Action for Canadian Patent Application No. 2,703,602, mailed Aug. 12, 2014.
USPTO, Office Action for U.S. Appl. No. 14/304,524, mailed Jun. 27, 2014.
USPTO, Response to Office Action for U.S. Appl. No. 14/304,524, mailed Sep. 23, 2014.
USPTO, Notice of Allowance and Fee(s) Due for U.S. Appl. No. 14/304,524, mailed Oct. 21, 2014.

* cited by examiner

LOW SHOCK STRENGTH INLET

This application is a divisional of co-pending U.S. patent application Ser. No. 12/000,066, filed Dec. 7, 2007, and entitled "Low Shock Strength Inlet" which, in turn, claims priority to U.S. Provisional Patent Application 60/960,986, filed Oct. 24, 2007, entitled "Supersonic Nacelle," both of which are hereby incorporated herein by reference in their entirety.

FIELD OF INVENTION

The embodiments of the present invention relate generally to supersonic inlets for supersonic aircraft and more particularly to supersonic inlets configured to reduce the supersonic inlet's contribution to the aircraft's sonic boom signature.

BACKGROUND OF THE INVENTION

Gas turbine engines can propel aircraft at supersonic speeds. However, the gas turbine engines generally operate on subsonic air flow in the range of about Mach 0.3 to 0.6 at the upstream face of an engine. The inlet of the engine functions to decelerate the incoming airflow to a speed compatible with the requirements of the gas turbine engine. In order to do this, the inlet has a compression surface and a corresponding flow path, used to decelerate the supersonic flow into a strong terminal shock. A diffuser further decelerates the resulting flow from the strong terminal shock to a speed corresponding to the requirements of the gas turbine engine.

A measurement of inlet operation efficiency is the total pressure lost in the air stream between the entrance side and the discharge side of the inlet. The total pressure recovery of an inlet is defined by a ratio of the total pressure at the discharge to the total pressure at the free stream. Maximizing the total pressure recovery leads to maximizing gross engine thrust, thus improving the performance of the propulsion system. Traditional inlet design methods have aimed at maximizing total pressure recovery. This traditional approach, however, often results in a complex inlet design with high drag.

A traditional approach to supersonic inlet design typically employs shock-on-lip focusing. As understood by those of skill in the art, shock-on-lip focusing involves designing a compression surface configuration of an external compression inlet such that the inlet-generated shocks (that occur at a supersonic design cruise speed) meet at a location immediately forward of the cowl highlight or the cowl lip. The advantages of shock-on-lip focusing include better pressure recovery and low flow spillage drag.

Also, when using shock-on-lip focusing, the cowl lip angle of the cowling may be aligned with the local supersonic flow in the vicinity of the terminal shock in order to prevent formation of an adverse subsonic diffuser flow area profile or a complex internal shock structure in the lip region. If this is not done, a complex internal shock structure and an adverse subsonic diffuser flow area profile may result, possibly reducing the inlet pressure recovery and flow pumping efficiency, as well as undermining diffuser flow stability.

Figure 1:
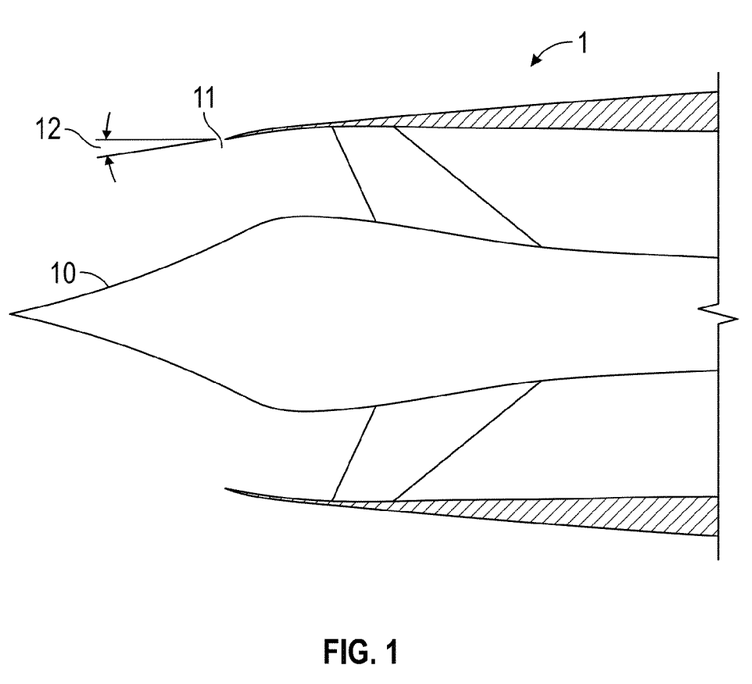
FIG. 1 schematically illustrates a side view of a conventional type of inlet for a supersonic aircraft.

As understood in the art, as supersonic design speed increases, so will the amount of compression necessary to decelerate the flow to a fixed terminal shock Mach number. Additional compression requires more flow-turning off of the inlet axis, resulting in a corresponding increase in the cowl lip angle (in order to align the cowl lip angle with the local flow at the terminal shock). FIG. 1 schematically illustrates a side view of a conventional inlet 1. Inlet 1 has a compression surface 10 and a cowl lip 11. Cowl lip 11 is positioned such that both an initial shock and a terminal shock from compression surface 10 meet at a point before the cowl lip 11. A cowl lip angle 12 is formed when the cowl lip 11 is aligned with the local flow. As mentioned, when the supersonic design speed increases, the amount of compression needed to decelerate the flow to a fixed terminal shock Mach number also increases, resulting in an increase in cowl lip angle. Any increase in cowl lip angle results in additional inlet frontal area, which increases inlet drag as speed increases. This adverse trend is a key reason why conventional external compression inlets lose viability at high supersonic Mach numbers.

One way to control lip drag, as discussed in U.S. Pat. No. 6,793,175 to Sanders, involves configuring the inlet to minimize the shape and size of the cowl. The configuration of the inlet initially resembles a circumferential sector of an axisymmetric intake, but switches the location of compression surface to the outer radius and disposes the cowling on the inner radius in a higher performance, 3-D geometry. The fact that the cowl is located on the inner radius reduces the physical arc of the cowl. Problems with this method include the aircraft integration challenges created by the 3-D geometry, such as the fact that the cross-sectional shape may be more difficult to integrate from a packaging perspective compared to an equivalent axisymmetric design for podded propulsion systems. In addition, the complex inlet shape is likely to create complex distortion patterns that require either large scale mitigating techniques in the subsonic diffuser or the use of engines with more robust operability characteristics.

Another way to control drag by reducing the cowl lip angle is based on decreasing the flow turn angle by increasing the inlet terminal shock Mach number. The improvement in drag reduction is often negated by the reduction in pressure recovery resulting from the stronger terminal shock. In addition, increasing the terminal shock Mach number at the base of the shock also encounters significant limitations in practice due to viscous flow effects. Higher terminal shock Mach numbers at the base of the shock aggravate the shock-boundary layer interaction and reduce shock base boundary layer health. The increase in shock strength in the base region also reduces inlet buzz margin, reducing subcritical flow throttling capability. Additionally, the increase in terminal shock Mach number will most likely require a complex boundary layer management or inlet control system.

Inlet compression surfaces are typically grouped into two types: straight or isentropic. A straight surface has a flat ramp or conic sections that produce discrete oblique or conic shocks, while an isentropic surface has a continuously curved surface that produces a continuum of infinitesimally weak shocklets during the compression process. Theoretically, a traditional isentropic compression surface can have better pressure recovery than a straight surface designed to the same operating conditions, but real viscous effects can reduce the overall performance of the isentropic surface inlets and result in poorer boundary layer health.

SUMMARY OF THE INVENTION

In accordance with one embodiment of the invention, a supersonic inlet may include a leading edge configured to generate a first shock wave, a compression surface positioned downstream of the leading edge, and a cowl lip spatially separated from the compression surface such that the cowl lip and the compression surface define an inlet opening for receiving a supersonic flow. The supersonic inlet may also include a bypass splitter disposed between the cowl lip and the center body to form a bypass. The compression surface may also be configured to generate a second shock wave, which during operation of the supersonic inlet at a predetermined cruise speed, extends from the compression surface to intersect the first shock wave at a first point spatially separated from the compression surface by a distance less than the distance separating the compression surface and the cowl lip such that the inlet captures the first shock wave.

In another embodiment of the invention, a supersonic propulsion system may be configured to include an engine having an air intake and an exhaust system, a subsonic diffuser section coupled to the air intake of the engine, and a supersonic compression section coupled to the subsonic diffuser and including a compression surface, a bypass splitter, and a cowl lip. The cowl lip may be spatially separated from the compression surface such that the cowl lip and the compression surface define an inlet opening for receiving a supersonic flow. The compression surface may also be configured to generate a first shock wave off a leading edge of the compression surface and a second shock wave such that the second shock wave extends from the compression surface to intersect the first shock wave at a first point located between the compression surface and the cowl lip, such that the inlet opening captures the first shock wave.

Another example of an embodiment of the invention may include the method of decelerating a supersonic flow for a supersonic propulsion system where the method includes cruising at a predetermined supersonic speed, receiving a supersonic flow in an inlet opening of an supersonic inlet of the supersonic propulsion system, generating a first shock wave, generating a second shock wave that intersects the first shock wave, receiving the first shock wave, during operation of the inlet at a predetermined supersonic speed, in the inlet opening, and splitting a subsonic flow into a primary flow portion and a bypass flow portion, whereby the bypass flow portion separates a substantially all flow distortion introduced when the inlet opening receives the first shock wave.

DETAILED DESCRIPTION OF THE INVENTION

The present disclosure will now be described more fully with reference to the Figures in which various embodiments of the invention are shown. The subject matter of this disclosure may, however, be embodied in many different forms and should not be construed as being limited to the embodiments set forth herein.

An embodiment of the invention may include a supersonic inlet for supersonic aircraft that is configured to reduce the inlet's contribution to a supersonic aircraft's sonic boom signature. To accomplish this, embodiments of the invention may position the cowl lip of the inlet such that the inlet captures the initial conic and/or oblique shock within the intake plane, preventing the conic shock energy or discontinuity from merging with the shocks generated by the airframe during supersonic flight. It is also contemplated that the cowl angle of the nacelle may be reduced to zero or substantially zero in order to reduce the contribution of cowl shock and cowl drag on the overall signature of a supersonic aircraft.

When designing an inlet in accordance with an embodiment of the invention, a relaxed isentropic compression surface may be used. As discussed in commonly owned U.S. patent application Ser. No. 11/639,339, filed Dec. 15, 2006 (entitled "Isentropic Compression Inlet for Supersonic Aircraft"), which is hereby incorporated by reference in its entirety, a reduction in cowl angle may be achieved by designing an inlet to employ a relaxed isentropic compression surface such that the cowl angle may be reduced. A "relaxed isentropic compression" surface is an isentropic compression surface where a plurality of Mach lines do not focus on the focus point where the initial shock and the terminal shock meet. This lack of Mach line focusing may be configured to produce a total level of compression less than the level of compression generated by a conventional isentropic compression surface designed to the same criteria. The relaxed isentropic compression surface may be configured to increase terminal shock Mach number in the region of the cowl lip (creating the mechanism that reduces flow angle at the lip), but retains a reasonable terminal shock Mach number along the remainder of the shock, including the base region of the terminal shock (preserving a reasonable overall pressure recovery characteristic and good shock stability). Such an arrangement may significantly reduce the local flow angle at the cowl lip, leading to a reduction in cowling angle and a substantial improvement in performance and a reduction in shock strength.

Figure 2:
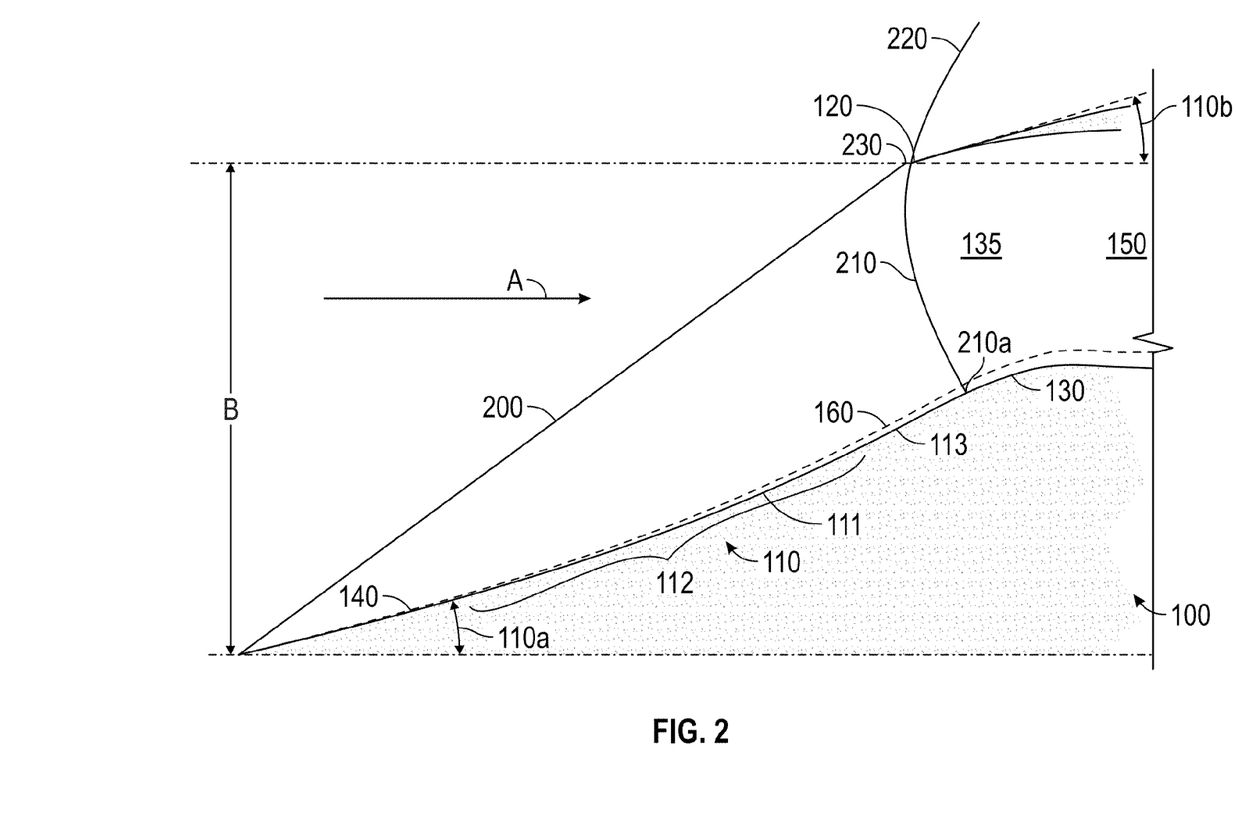
FIG. 2 schematically illustrates a side elevation view of a supersonic aircraft inlet entrance.

FIG. 2 schematically illustrates a side view cross section of a relaxed isentropic external compression inlet 100 configured using shock-on-lip focusing as disclosed in U.S. patent application Ser. No. 11/639,339. The inlet 100 includes a compression surface 110 with an initial straight surface 140 at an initial turn angle 110a. The compression surface 110 includes a second compression surface 111 comprising a curved section 112 and a straight section 113. The compression surface 110 transitions into a shoulder 130, which defines the throat 135, the narrowest portion of the inlet 100 flow path. The inlet 100 also includes cowl lip 120 positioned at a cowl angle 110b measured off the centerline of the inlet 100. Although only the curved section 112 of the second compression surface 111 generates isentropic compression, the entire compression surface 110 is referred to herein as a relaxed isentropic compression surface. For comparison, an example of a traditional isentropic compression surface 160 is shown in a dashed line. After the flow reaches throat 135, subsonic diffuser 150 provides a divergent flow path delivering subsonic flow to the engine.

The inlet 100 first generates an initial shock 200 as the air flow in region B travels in direction A and encounters the compression surface 110 of inlet 100. The compression surface 10 may be configured to generate a terminal shock 210, having a base 210a adjacent to the compression surface 110. As shown in FIG. 2, the initial shock 200 and the terminal shock 210 are focused at a shock focus point 230. A cowl shock 220 is shown extending upward off the cowl lip 120. The relaxed isentropic compression surface allows for significant tailoring of the terminal shock 210 such that the outer radial region of the shock is nearly orthogonal to the inlet centerline. By shaping the terminal shock using relaxed compression, the cowl lip 120 may be aligned with the local flow angle in this outer radial region of the shock, greatly reducing the cowl lip angle. In addition, discrete adverse flow features, such as secondary shock formation or flow separation, may be reduced at the cowl lip region.

Although the cowl angle may be greatly reduced when using a relaxed isentropic compression inlet in accordance with FIG. 2, the cowl lip is still aligned with the local flow angle in the outer radial region of the terminal shock directly in front of the cowl lip. As would be understood by those of skill in the art, reducing the cowl angle 110b, from the angle shown in FIG. 2 to zero or substantially zero may result in flow distortion in the diffuser which may increase when the cowling angle no longer aligns with the local flow in the vicinity of the terminal shock. This condition may generate secondary shocks and adverse pressure fields in the vicinity of the cowl lip, which can introduce strong tip radial blockage defects in the flow seen by the engine at the fan face. Further, simply reducing the cowl angle 110b to zero or substantially zero may also create temporal flow instability within the diffuser, potentially resulting from the flow disturbances created in the outer radial region which may initiate and sustain diffuser flow resonance. Such resonance may adversely affect performance and potentially damage the inlet and the engine.

Additionally, a simple reduction in cowl angle may be ineffective in controlling aft cowling drag, or drag on the nacelle aft of the cowl lip resulting from any increase in nacelle diameter as the nacelle profile encompasses the engine. This increase in nacelle diameter may cause a sharper gradient in the surface angle of the cowling as the maximum nacelle diameter is approached.

Furthermore, when the cowl lip is positioned to capture the initial or conic shock and the terminal shock in accordance with embodiments of the invention, flow instabilities internal to the inlet may be introduced. As understood by those of skill in the art, the capture of the conic and terminal shocks may decrease the predictability of the post terminal shock flow environment and introduce flow separation on the inside cowl surface and produce unwanted flow dynamics.

Embodiments of the invention may be configured to mitigate the above-discussed adverse effects of zero cowl angle and conic and terminal shock capture by employing a flow bypass system to separate and isolate the outer radial flow captured by an inlet and bypass that separated flow around the engine. Embodiments of the invention may use the nacelle bypass design as described in commonly owned U.S. Patent Application No. 60/960,986, filed Oct. 24, 2007 (entitled "Supersonic Nacelle"), which is hereby incorporated by reference in its entirety.

By combining initial shock capture, an internal bypass, and a zero cowl angle, embodiments of the invention may be configured to reduce spillage-related drag and cowl shock strength by capturing the strength of the initial conic shock and the terminal shock internal to the inlet. More specifically, capture of the conic and terminal shocks may permit the shock energy or discontinuity to be retained within the nacelle flow paths, preventing the shock from merging with shocks generated by the airframe during supersonic flight and contributing to the overall sonic boom signature. The use of a nacelle bypass flow path may be configured to provide a separation, isolation, and disposal mechanism for the resulting spatial and temporal flow defects that may be produced by shock capture and zero cowl angle, leaving a primary flow path available for use by the engine.

Figure 3:
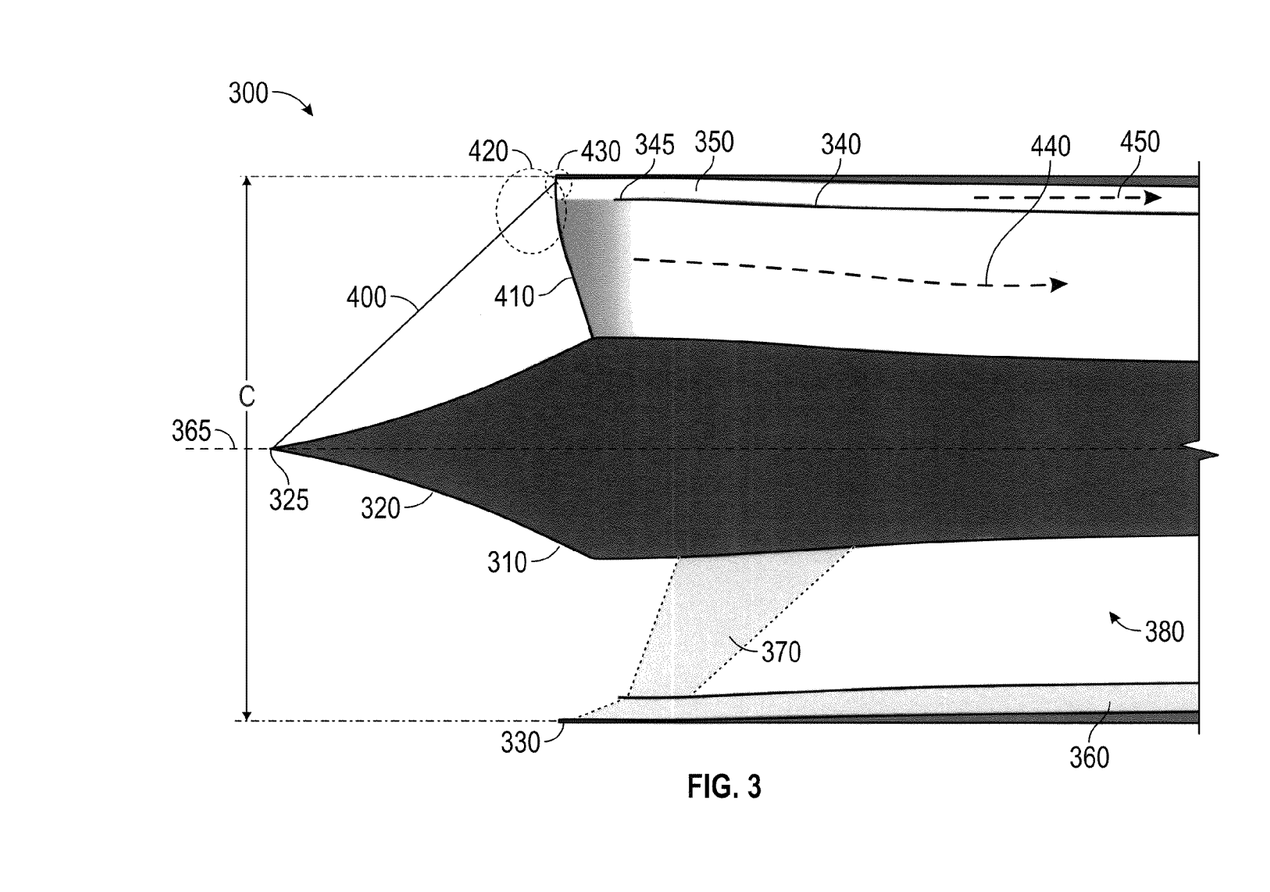
FIG. 3 schematically illustrates a side view of an inlet in accordance with an embodiment of the invention.

FIG. 3 schematically illustrates a cross-sectional view of an inlet 300 in accordance with an embodiment of the invention. Supersonic inlet 300 includes a center body 310 with a relaxed isentropic compression surface 320 and a leading edge 325. It should be understood that, while a relaxed isentropic compression surface is shown and described with reference to FIG. 3, other compression surfaces, such as a fully isentropic surface or a straight surface compression surface, may be used. Inlet 300 also includes a cowl lip 330 and a bypass splitter 340 in order to form a nacelle bypass 350. A bypass strut 360 and a primary strut 370 (which are only shown on the bottom of the nacelle 300 and have been removed from the top of the nacelle 300 for clarity) may provide structural support to the inlet, producing a stiff, strong, and lightweight nacelle structure, while maximizing the internal nacelle volume. As discussed in U.S. Patent Application No. 60/960,986, the bypass strut 360 can also be used to tailor the direction and the amount of airflow depending on local blockage characteristics within the bypass region.

As shown in FIG. 3, the inlet structure and arrangement may be configured such that the cowl lip angle is extremely small or even reduced to zero. As would be understood by those of skill in the art, a zero or substantially zero cowl lip angle reduces the strength of the cowl shock due to reductions in the projected surface area exposed to the freestream flow. Although the thickness of the cowl lip may include some finite amount of material required to build the cowl lip, the cowl lip structure may be extremely thin, depending on materials and application. It is contemplated that the nacelle wall thickness may grow inward moving aft along the internal flowpath, providing the volume necessary to incorporate structure while maintaining the uniform external diameter surface shape.

By employing a zero or substantially zero cowl lip angle, with reference to a inlet axis 365, the region C may grow, especially if the nacelle is configured to fully encompass the engine without significant growth or contraction in the outer diameter of the nacelle. Such a configuration may reduce or eliminate the typical sharp growth of the outer diameter of the nacelle aft of the cowl lip as the nacelle encompasses the engine. As understood by those of skill in the art, a more cylindrical shape of uniform outer diameter may significantly reduce cowling drag and cowl shock strength.

In accordance with embodiments of the invention, the nacelle bypass 350 may be configured to handle the additional airflow that may enter the inlet due to the larger region C. By employing the bypass 350, the inlet 300 may be configured to dispose of the excess flow, which would alternatively spill around the exterior of the cowl lip, creating higher drag and defeating the objective of a lower sonic boom signature. The nacelle bypass 350 avoids these spillage-related issues by routing the additional flow through the nacelle and around the engine, eventually exhausting back to the free stream.

The nacelle bypass 350 may also serve to separate the flow distortion captured by the inlet 300. As discussed in U.S. patent application Ser. No. 11/639,339, the use of a relaxed isentropic compression surface 320 may generate an initial shock 400 and a terminal shock 410, which may be focused at a point. The relaxed isentropic compression surface may also be configured to tailor the terminal shock 410 such that a region 420 of relaxed compression is produced. As a result, the strong velocity gradient in the outer radial region may generate the region 420 of flow distortion. In accordance with embodiments of the invention, the bypass 350 may be structured and arranged to separate the worst of the flow distortion internal to the inlet 300 as shown as region 430. This region 430 may include flow distortions introduced by the intersection of the initial shock 400 and the terminal shock 410. In addition, the region 430 may include flow distortion created by the sharp cowl lip 330, which may produce unfavorable flow distortion in the presence of cross-flow; for example, when the vehicle experiences significant sideslip or angle-of-attack, or when the vehicle is subjected to high crosswinds while operating on the ground.

More specifically, the bypass 350 operates to split the distorted flow in the region 430 into the bypass 350, forming a bypass flow 450, which is separated from the primary flow 440 by the splitter 340. The splitter 340 prevents the bypass flow 450 and its inherent flow distortions from reaching the sensitive turbomachinery. The resulting primary flow 440 may then exhibit more uniform flow that may provide significant benefits to engine life and engine maintenance factors and improved fan and compressor stability margins. The primary flow 440 profile may also benefit the engine performance by providing an increase in pressure recovery that results from the removal of the more distorted, lower pressure flow found in the region 430. The subsonic diffuser 380 may be configured to further slow the primary flow 440 into a subsonic flow suitable for use by the engine. Also, the blunt leading edge 345 of bypass splitter 340 may be configured to couple favorably with cowl lip 330 to produce a reduced flow distortion profile for the engine, similar to a traditional subsonic inlet.

The nacelle bypass 350 may also provide for the disposition of residual discrete flow defects or temporal flow instabilities, such as blockage profiles resulting from flow separation or secondary shocks within the cowl lip area. The bypass 350 may work to eliminate resonance coupling between tip radial and centerbody boundary layer-related flow features that can otherwise create adverse and strong instabilities, such as inlet buzz and other resonance types.

In accordance with embodiments of the invention, the inlet 300 may capture the initial conic or oblique shock 400 within the intake plane of inlet 300. Capturing the conic shock 400 may be accomplished by either a forward extension or movement of the cowling or by sizing the inlet to a Mach number slightly lower than the design point. Although capturing the conic shock 400 would typically introduce large-scale flow instabilities from the interaction between the conic shock and the boundary layer immediately aft of the cowl lip, the bypass 350 may be configured such that the conic shock 400 may be captured without significant impact on the primary flow 440. As a result, the nacelle bypass 350 provides for a separation, isolation, and disposal mechanism for the resulting spatial and temporal flow defects produced by conic shock capture, leaving the primary flow path 440 significantly unaffected.

Figure 4:
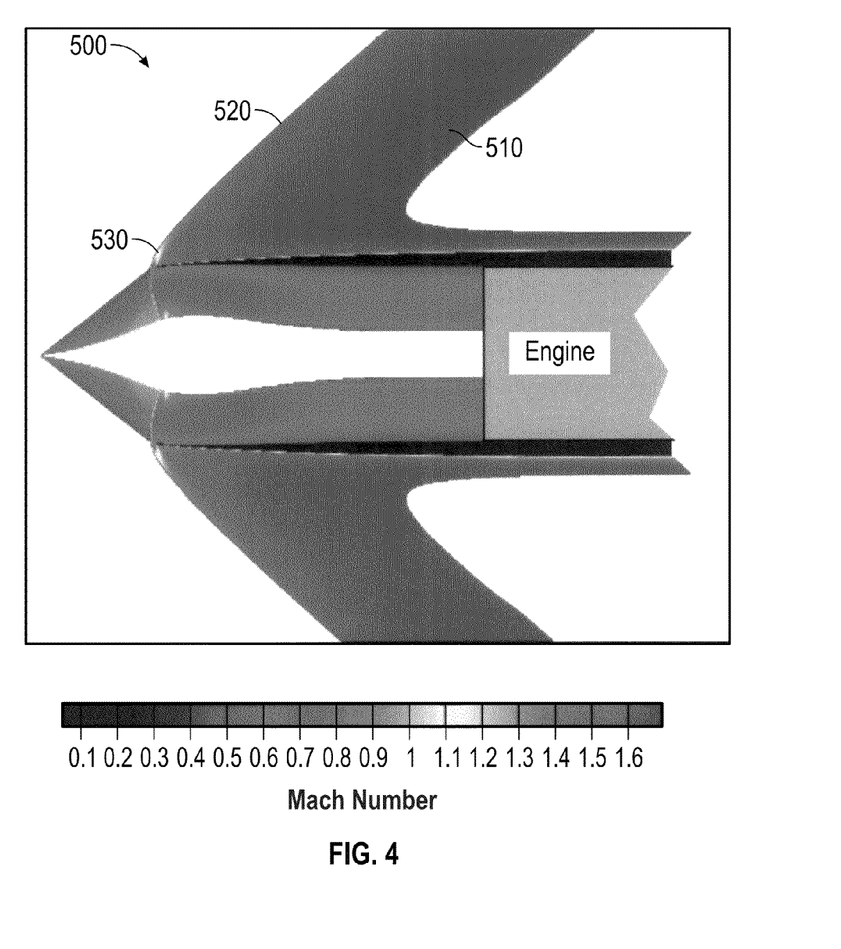
FIG. 4 illustrates a Mach color Computational Fluid Dynamics (CFD) solution of an inlet with a conventional cowl.
Figure 5:
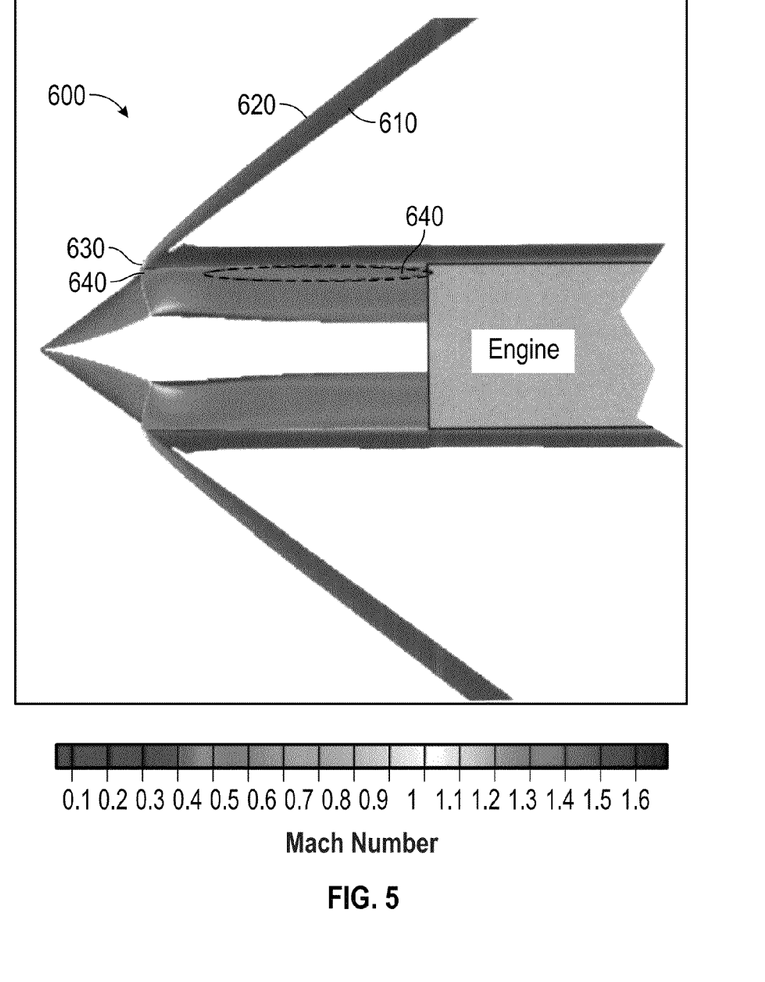
FIG. 5 illustrates a Mach color CFD solution of an external compression inlet with a zero-angle cowl in accordance with an embodiment of the invention.

FIG. 4 illustrates a Mach color computational fluid dynamics (CFD) solution for an inlet 500 employing a relaxed isentropic compression design and shock-on-lip focusing with a cowl lip placed such that the conic shock is not captured by the inlet. FIG. 5 illustrates a Mach color computational fluid dynamics (CFD) solution for an inlet 600 in accordance with an embodiment of the invention. As with inlet 500, the inlet 600 employs a relaxed isentropic compression design. However, inlet 600 includes a zero cowl angle and is configured to capture the conic shock internal to the inlet. FIGS. 4 and 5 represent inlets sized for a turbofan-type engine featuring approximately 15,000 lbf of maximum takeoff thrust and a moderate fan-to-compressor flow ratio of 3. Those areas of the flow field disturbed by less than 0.01 Mach number unit from the freestream Mach number value are rendered white in both FIGS. 4 and 5.

In comparison, the inlet 600 in FIG. 5 exhibits a greatly reduced shock disturbance region 610 due to the zero-angle cowl and conic shock capture. This may be easily seen by comparing the shock disturbance region 510 in FIG. 4 and the shock disturbance region 610 in FIG. 5. In FIG. 4, a large region 510 of disturbance is shown extending out and away from much of the forward nacelle surface. This indicates that the cowl shock 520, in FIG. 4, is much stronger that the cowl shock 620, in FIG. 5. The strong cowl shock 520 will propagate away from the nacelle and eventually merge with shocks generated by aircraft airframe. In FIG. 5, however, a relatively thin cowl shock disturbance 610 extends out and away from only the very tip of the nacelle adjacent to the zero-angle cowl lip. This is indicative of a much weaker cowl shock 620 that will contribute little to the overall sonic boom signature.

Also illustrated in FIGS. 4 and 5, the reduction in spillage may be seen for inlet 600 over inlet 500. As would be appreciated by one of skill in the art, the flow spillage 630 shown in FIG. 5 for the inlet 600 is significantly less that the small amount of flow spillage 530 shown in FIG. 4 for the inlet 500. Specifically, FIG. 5 shows minimal spillage close to the cowl lip, indicated by a significantly reduced cowl shock strength. For inlet 600, these reductions in shock strength directly reduce the inlet's contribution to a sonic boom signature for a supersonic aircraft employing inlet 600. As one of ordinary skill in the art will appreciate, the capture of the conic shock functions to virtually eliminate the flow spillage 630 and its related contribution to shock strength. Moreover, the lack of any significant cowling profile (due to zero cowl angle) virtually eliminates cowl shock and cowl drag. The reduction in flow spillage 630 also reduces drag.

FIG. 5 also illustrates the flow distortion that is separated and isolated from the engine face. As discussed above, the zero or substantially zero cowl angle and the capture of the conic and terminal shocks may introduce flow distortions located in the outer radial region of the inlet. Although the bypass splitter 340 (shown in FIG. 3) is not shown in FIG. 5, the flow distortion 640 adjacent to the cowl lip and the outer surface of the diffuser walls illustrates adverse flow characteristics that could be detrimental to the operability, performance, and life of the fan blades at an engine face. As discussed above, these adverse flow characteristics may be separated and isolated by the bypass 340.

It is contemplated that the invention could be applied to other air-breathing propulsion systems configured for supersonic flight. These propulsion systems could employ conventional turbojet and turbofan engines, combined cycle engines, ramjets, or scramjets. Propulsion systems employing variable cycle engine features, such as flaked turbomachinery, may also be used. In addition, inlets designed according to the disclosed technology may be axisymmetric, two-dimensional, or three-dimensional in their intake and diffuser design. It is also contemplated that embodiments of the invention may be applied to other types of compression inlets, such as a mixed compression inlet.

The foregoing descriptions of specific embodiments of the invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

The invention claimed is:

1. A method of decelerating a supersonic flow for a supersonic propulsion system, the method comprising:

cruising at a predetermined supersonic speed;

receiving a supersonic flow in an inlet opening of a supersonic inlet of the supersonic propulsion system;
generating a first shock wave upstream of the inlet opening;
directing the first shock wave into the inlet opening;
generating a terminal shock wave, during operation of the inlet at the predetermined supersonic speed, in the inlet opening;
splitting a subsonic flow downstream of the terminal shock wave into a primary flow portion and a bypass flow portion;
directing the primary flow portion to an engine of the propulsion system; and
directing the bypass flow portion to a nacelle bypass that bypasses the engine, the bypass flow portion including substantially all flow distortion introduced when the inlet opening receives the first shock wave.

2. The method of claim 1, wherein the supersonic propulsion system includes an inlet having a compression surface, a bypass splitter, and a cowl lip, the cowl lip spatially separated from the compression surface such that the cowl lip and the compression surface define the inlet opening.

3. The method of claim 1, further comprising substantially aligning the cowl lip with an inlet axis.

4. The method of claim 1, further comprising generating isentropic compression of the supersonic flow using a curved section of the compression surface.

* * * * *